United States Patent
Ware (10) Patent No.: US 10,628,003 B1
(45) Date of Patent: Apr. 21, 2020

(54) PROCESS FOR MAKING A CALL WITH A MOBILE DEVICE WHILE VIDEO RECORDING ON THE MOBILE DEVICE

(71) Applicant: Parker Charles Ware, Ladera Ranch, CA (US)

(72) Inventor: Parker Charles Ware, Ladera Ranch, CA (US)

( * ) Notice: Subject to any disclaimer, the term of this patent is extended or adjusted under 35 U.S.C. 154(b) by 0 days.

(21) Appl. No.: 16/107,945

(22) Filed: Aug. 21, 2018

Related U.S. Application Data (60) Provisional application No. 62/548,715, filed on Aug. 22, 2017.

(51) Int. Cl.
| | | |
|---|---|---|
| *G06F 3/0484* | (2013.01) | |
| *H04M 1/725* | (2006.01) | |
| *G06F 3/0488* | (2013.01) | |
| *G06F 3/0481* | (2013.01) | |
| *H04N 5/77* | (2006.01) | |
| *H04N 5/232* | (2006.01) | |
| *G06F 3/16* | (2006.01) | |
| *G06F 3/0482* | (2013.01) | |

(52) U.S. Cl.
CPC .......... *G06F 3/0484* (2013.01); *G06F 3/0482* (2013.01); *G06F 3/04817* (2013.01); *G06F 3/04883* (2013.01); *G06F 3/167* (2013.01); *H04M 1/72583* (2013.01); *H04N 5/232933* (2018.08); *H04N 5/772* (2013.01); *G06F 2203/04803* (2013.01); *G06F 2203/04804* (2013.01)

(58) Field of Classification Search
CPC ...... G06F 3/0484; G06F 3/0482; G06F 3/167; G06F 3/04817; G06F 3/04883; G06F 2203/04804; G06F 2203/04803; H04M 1/72583; H04N 5/772
See application file for complete search history.

(56) References Cited

U.S. PATENT DOCUMENTS

| | | | | |
|---|---|---|---|---|
| 2010/0251119 | A1* | 9/2010 | Geppert | G06F 3/04817 715/716 |
| 2011/0058011 | A1* | 3/2011 | Kim | H04M 1/72522 348/14.02 |
| 2011/0164141 | A1* | 7/2011 | Tico | G10L 21/0208 348/207.99 |
| 2012/0148216 | A1* | 6/2012 | Pavagada | G11B 27/02 386/278 |
| 2016/0180845 | A1* | 6/2016 | Kim | G06F 3/167 348/211.2 |
| 2018/0350225 | A1* | 12/2018 | Siminoff | H04N 7/186 |

* cited by examiner

*Primary Examiner* — Ajay M Bhatia
*Assistant Examiner* — Mong-Shune Chung
(74) *Attorney, Agent, or Firm* — Plager Schack LLP; Mark H. Plager; Stephen Hallberg (57) ABSTRACT

A process for making a call with a mobile device while video recording on the mobile device is disclosed. The process, when implemented as a mobile app, provides a semi-transparent built-in 'phone' icon or 'dial pad' on a video/image recording screen so with a couple of taps a phone call can be made while on the recording screen, before video recording or during. In this way, the process allows a person to make a phone call directly from the video recording screen of the mobile device without closing or minimizing the video recording screen, thereby ensuring that the person does not miss anything in or any moment of the recording video while providing an efficient and directly accessible way to call for help without wasting any time.

10 Claims, 6 Drawing Sheets

PROCESS FOR MAKING A CALL WITH A MOBILE DEVICE WHILE VIDEO RECORDING ON THE MOBILE DEVICE

CLAIM OF BENEFIT TO PRIOR APPLICATION

This application claims benefit to U.S. Provisional Patent Application 62/548,715, entitled "PROCESS FOR MAKING A CALL WHILE IN THE CAMERA (VIDEO RECORDING/IMAGE SCREEN) APP ON A MOBILE DEVICE," filed Aug. 22, 2017. The U.S. Provisional Patent Application 62/548,715 is incorporated herein by reference.

BACKGROUND

Embodiments of the invention described in this specification relate generally to multiple functions on mobile device, and more particularly, to a process for making a call with a mobile device while video recording on the mobile device.

People always video record situations when they happen, or while they are in the process of occurring, instead of calling for emergency services. This is the result of the fact that no devices out there currently support the phone call from the video recording/picture screen on a mobile device. Thus, the conventional mechanisms only provide for one action to be performed at a time, which makes the mobile device operator choose between capturing evidence, or getting help quickly by calling a number.

Therefore, what is needed is a way to make a call with a mobile device while video recording or capturing images on the mobile device, such as by a built in "phone' icon or 'dial pad' on the video/image recording screen so with a couple of taps a phone call can be made while on the recording screen, either before recording or during.

BRIEF DESCRIPTION

A process for making a call with a mobile device while video recording on the mobile device is disclosed. The process for making a call with a mobile device while video recording on the mobile device of some embodiments is implemented as software visually outputs a built-in 'phone' icon or 'dial pad' on the video/image recording screen so with a couple of taps a phone call can be made while on the recording screen, before video recording or during.

In some embodiments, the built-in 'phone' icon or 'dial pad' is a minimally invasive movable graphical icon that limits an amount of obstruction of visible output of a video that is being recorded or a live scene in the field of view of the camera (before recording) of the mobile device. In some embodiments, the built-in 'phone' icon or 'dial pad' is semi-transparent. As such, the video that is being recorded or the live scene in the field of view of the camera (before recording) is always visible to a user of the mobile device. In some embodiments, the process for making a call with a mobile device while video recording on the mobile device, when implemented as a mobile app, provides an efficient and directly accessible way for the user to call for help without wasting any time or missing important recordable events because the semi-transparent 'phone' icon or 'dial pad' icon does not block the field of view of the camera or the recording video. In this way, the user can make calls for help directly from the video recording screen of the mobile device without closing or minimizing the video recording screen, thereby ensuring that the user does not miss anything in the recording video or any moment of the live scene in the field of view of the camera.

In some embodiments, the process for making a call with a mobile device while video recording on the mobile device includes a plurality of steps comprising (i) opening a video capture mobile app on a mobile device of a user, (ii) initiating video recording by an onboard video capture device of the mobile device via the video capture mobile app, (iii) tapping and holding a phone-dial pad icon visually output by the video capture mobile app onto a screen of the mobile device while the video recording is ongoing by the video capture device of the mobile device, (iv) sliding the phone-dial pad icon to one of the right and the left to initiate a drop down of multiple contacts, (v) selecting one contact from the multiple contacts, (vi) dialing a number associated with the selected contact, (vii) initiating a speaker phone call with the selected contact when the mobile device is connected to a phone associated with the number of the selected contact, (viii) continuing to capture video with the video capture device of the mobile device while the speaker phone call is actively connected to the phone of the selected contact, and (ix) shrinking a viewable area of the speaker phone call so as to minimize display obstruction of a field of view that is captured by the video capture device and visually output onto the screen of the mobile device during or prior to recording video and to maximize the display of the field of view that is visually output onto the screen of the mobile device during or prior to recording video by the video capture device.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel process for making a call with a mobile device while video recording on the mobile device. The process for making a call with a mobile device while video recording on the mobile device of some embodiments is implemented as software visually outputs a built-in 'phone' icon or 'dial pad' on the video/image recording screen so with a couple of taps a phone call can be made while on the recording screen, before video recording or during.

In some embodiments, the built-in 'phone' icon or 'dial pad' is a minimally invasive movable graphical icon that limits an amount of obstruction of visible output of a video that is being recorded or a live scene in the field of view of the camera (before recording) of the mobile device. In some embodiments, the built-in 'phone' icon or 'dial pad' is semi-transparent. As such, the video that is being recorded or the live scene in the field of view of the camera (before recording) is always visible to a user of the mobile device. In some embodiments, the process for making a call with a mobile device while video recording on the mobile device, when implemented as a mobile app, provides an efficient and directly accessible way for the user to call for help without wasting any time or missing important recordable events because the semi-transparent 'phone' icon or 'dial pad' icon does not block the field of view of the camera or the recording video. In this way, the user can make calls for help directly from the video recording screen of the mobile device without closing or minimizing the video recording screen, thereby ensuring that the user does not miss anything in the recording video or any moment of the live scene in the field of view of the camera.

In some embodiments, the process for making a call with a mobile device while video recording on the mobile device includes a plurality of steps comprising (i) opening a video capture mobile app on a mobile device of a user, (ii) initiating video recording by an onboard video capture device of the mobile device via the video capture mobile app, (iii) tapping and holding a phone-dial pad icon visually output by the video capture mobile app onto a screen of the mobile device while the video recording is ongoing by the video capture device of the mobile device, (iv) sliding the phone-dial pad icon to one of the right and the left to initiate a drop down of multiple contacts, (v) selecting one contact from the multiple contacts, (vi) dialing a number associated with the selected contact, (vii) initiating a speaker phone call with the selected contact when the mobile device is connected to a phone associated with the number of the selected contact, (viii) continuing to capture video with the video capture device of the mobile device while the speaker phone call is actively connected to the phone of the selected contact, and (ix) shrinking a viewable area of the speaker phone call so as to minimize display obstruction of a field of view that is captured by the video capture device and visually output onto the screen of the mobile device during or prior to recording video and to maximize the display of the field of view that is visually output onto the screen of the mobile device during or prior to recording video by the video capture device.

As stated above, people always video record situations when they happen or while they are in the process of occurring, instead of calling for emergency services. Embodiments of the process for making a call with a mobile device while video recording on the mobile device described in this specification solve such problems by providing an option to make a call while in an app for image capture/video capture. The conventional mechanisms employed on phones today do not have an option to make a phone call while they are on the image or video recording screens; either during recording of a video/image or before/after recording. In contrast, the process for making a call with a mobile device while video recording on the mobile device would allow someone to start recording an event or incident, then simultaneously make a phone call on speakerphone (by default) with a couple of taps of the screen, without having to stop video recording and change screens on the mobile device.

Embodiments of the process for making a call with a mobile device while video recording on the mobile device described in this specification differ from and improve upon currently existing options. In particular, some embodiments of the process for making a call with a mobile device while video recording on the mobile device differ by allowing people to call emergency services while recording an incident, instead of having to choose between one or the other. Currently there is no option to make a phone call from the recording/video screen either before or during recording.

In addition, the process for making a call with a mobile device while video recording on the mobile device improves upon the currently existing options because mobile devices on the market today do not support this type of simultaneous operation from the video recording screen. The operator more than often chooses to record video than call for help which is valuable time lost. In some embodiments, the process for making a call with a mobile device while video recording on the mobile device can be implemented as a mobile app which overlays camera function or image capture function on the device, or may have a built in 'phone' icon or 'dial pad' on the video/image recording screen so with a couple of taps a phone call can be made while on the recording screen. Also, this type of function or option could be incorporated into a camera that automatically calls emergency services based off certain situations the camera sees, as well as backing up the video to a cloud storage so it cannot be deleted. In some embodiments, the video is live streamed to one or more other devices. Examples of live streaming include, without limitation, Facebook® live stream, Instagram® live feeds, etc. Live streaming of the video can occur in combination with recording the video for local device playback and storing the recorded video in the cloud storage, or alternatively, can occur without storing the video locally or instead of recording and storing the video in cloud storage.

The process for making a call with a mobile device while video recording on the mobile device of the present disclosure may be comprised of the following steps. This list of possible constituent steps is intended to be exemplary only and it is not intended that this list be used to limit the process for making a call with a mobile device while video recording on the mobile device of the present application to just these steps. Persons having ordinary skill in the art relevant to the present disclosure may understand there to be equivalent steps that may be substituted within the present disclosure without changing the essential function or operation of the process for making a call with a mobile device while video recording on the mobile device.

1. On a mobile device, open up a video capture mobile app ("camera app") that is capable of directing an onboard video capture device ("camera") to start operating, either to capture a field of view of a live scene or capture a video recording (or capture one or more still images or limited motion clip images by the camera).

2. Initiate video recording from within the camera app on the mobile device. Alternatively, prior to recording the user can operate the video capture device to capture the field of view of the camera in a way that shows the live scene without recording video. For example, the user waits for instructions from emergency services on the phone to begin recording video after capturing the field of view of the scene without recording.

3. Tap and hold phone/dial-pad icon on video screen. Alternatively, an AI powered voice activated audible assistant app can be triggered by user's voice control commands. For example, the user may audibly command the audible assistant app to call a contact or call emergency service (e.g., "call 911", "call for an ambulance", "call the fire department", etc.). Another option could be to call for help with a button on the side or combination.

4. Slide icon to the right or left to initiate a drop down of multiple contacts (e.g., top three 'favorite' contacts, contacts selected at an earlier time, with 911/emergency contact number always being shown by default as a selectable contact option in the drop down). Alternatively, if the dial pad shows, allow for a transparent or semi-transparent (translucent) dial pad to dial any number or contact to call.

5. Once a selected contact or number is dialed, select a 'Call' button to initiate a speakerphone call.

6. Continue recording the video while talking on speakerphone to emergency services or other help.

7. Call information will shrink to a smaller size to maximize recording screen view. Alternatively, the call information is visually output as a semi-transparent overlay, thereby allowing the screen to be continuously displayed while recording.

The various elements of the process for making a call with a mobile device while video recording on the mobile device of the present disclosure may be related in the following exemplary fashion. It is not intended to limit the scope or nature of the relationships between the various elements and the following examples are presented as illustrative examples only. Open up the camera app or video recording application on the phone. Select to call a contact or dial a phone number with the dial pad, or use voice dialing through AI (Cortana, Siri, OK Google) to dial a contact or number. Predictive contacts will display with dial pad when number-to-letter corresponds with the contacts name in Address Book. While still recording the phone call will be active on speakerphone. Once video recording is done it will save to the phone just like a normal video is done on a mobile device today.

The process for making a call with a mobile device while video recording on the mobile device of the present disclosure generally works by implementation of a software application (or mobile app) and/or as an add-on extension/application to the on-board (default) camera application on the phones of the day (i.e., the iPhone/Android/Windows mobile devices). Alternatively, a new camera recording application that has the ability to place a phone call while recording/filming can be designed and coded. The implemented or designed software app would generally be capable of multiple operations, such that once the user starts filming an important incident, the user can initiate a phone call that will default to speakerphone. This can be done in any of several ways, including, for example pressing or dragging a phone icon that is on the screen, using the voice commands of the phone to call a contact, or by pressing a small dial pad icon on the screen so a transparent dial pad appears so you can still see what you are recording. This will allow the operator to record important and/or emergency situations while talking to emergency services or an important contact at the same time. No longer will the user have to choose between recording a situation and/or evidence, or calling for emergency help. The user can do both at the same time without wasting valuable time.

Figure 1:
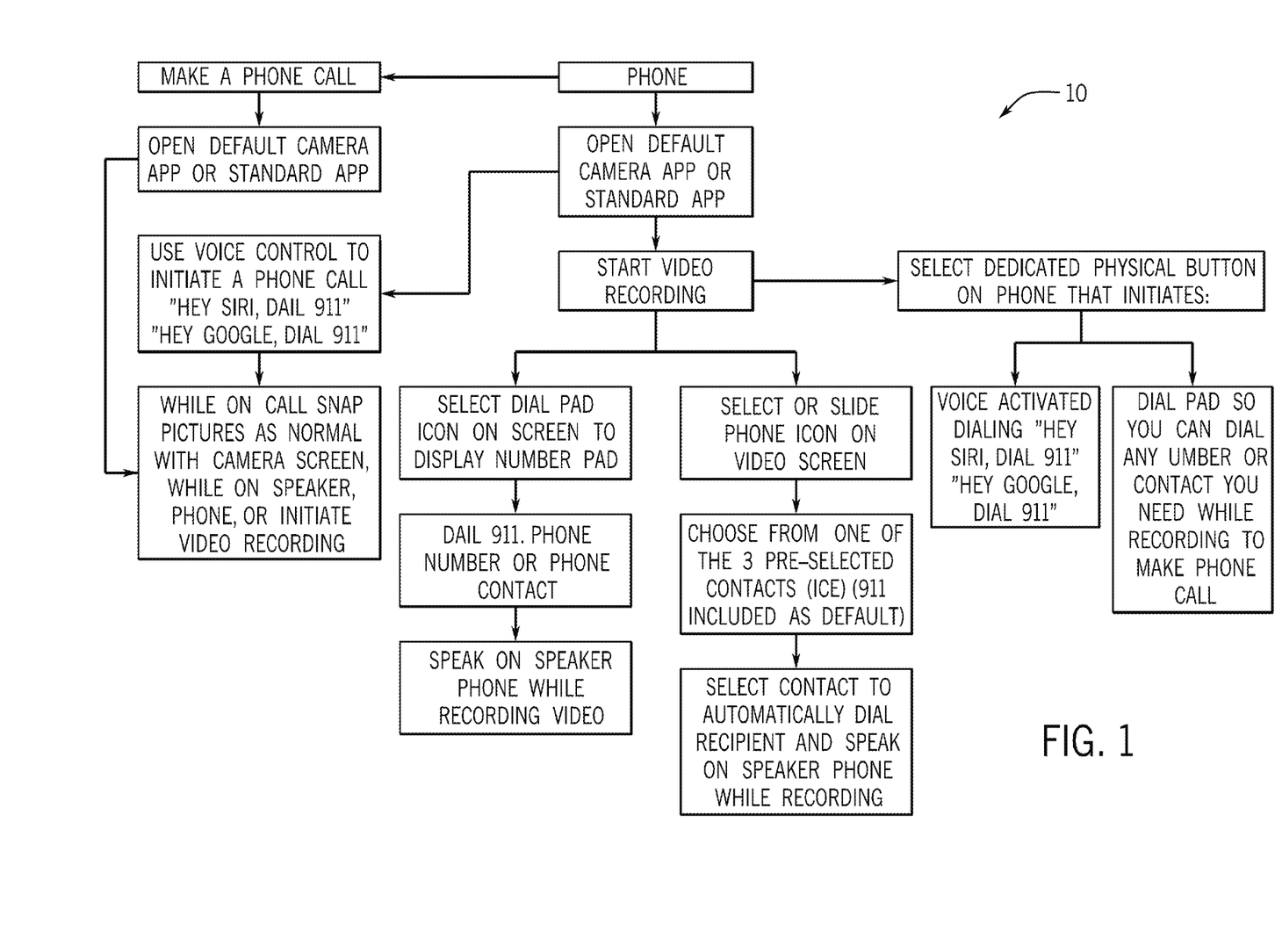
FIG. 1 conceptually illustrates a process for making a call with a mobile device while video recording on the mobile device in some embodiments.
Figure 2:
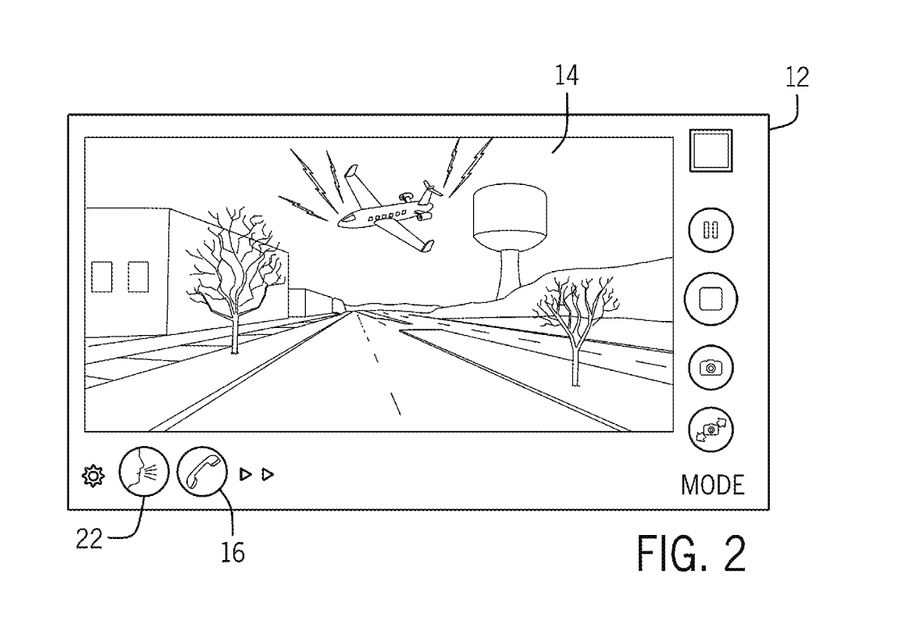
FIG. 2 conceptually illustrates a display of a mobile device with a field of view as captured through a camera of the mobile device in some embodiments.

By way of example, FIG. 1 conceptually illustrates a process for making a call with a mobile device while video recording on the mobile device 10. As shown in this figure, the process for making a call with a mobile device while video recording on the mobile device 10 starts with a user of a phone opening a default camera app or standard app on the phone or making a phone call with the phone. In some embodiments, the phone is a mobile device, such as a smartphone. The option to start by opening the default camera app or make a phone call is at the user's discretion (hereinafter referred to as "call first mode" when the user first makes a call and "video first mode" when the user first opens the camera app (or standard app). The call first mode occurs when the user starts by making a phone call. Thus, in call first mode the process for making a call with a mobile device while video recording on the mobile device 10 includes the user making a phone call (e.g., to emergency services or to first responder contacts), and then proceeds to the step to open the default camera app or standard app. On the other hand, sometimes the user starts by opening the default camera app on the mobile device. Thus, in video first mode, the process for making a call with a mobile device while video recording on the mobile device 10 proceeds to the step to open the camera app (or standard app), followed by using voice activated phone dialing control to initiate a phone call (e.g., to emergency services or to first responder contacts).

In some embodiments, the process for making a call with a mobile device while video recording on the mobile device 10 continues to a step in which the user is still on the phone call and snapping pictures as normal with camera screen, while on speaker, phone, or initiating or starting a video recording. As video recording gets started, the process for making a call with a mobile device while video recording on the mobile device 10 of some embodiments includes a step to select a dedicated physical button on the phone that initiates (i) an AI powered audible assistance module that is capable of voice activated phone dialing and (ii) a dial pad (displayed on the mobile device screen in the camera/standard app) so that the user can dial any number or contact while recording to make the phone call.

Contemporaneously with selected the step to select the dedicated physical button the phone, the process for making a call with a mobile device while video recording on the mobile device 10 includes several user steps in which (a) the user selects the dial pad icon on the phone screen to display the number pad, dials emergency services or a phone number/close contact (e.g., dialing 911 for emergency services), and the user speaks on the phone's speaker/microphone or speakerphone while recording video, and (b) the user selects or slides the phone icon on the video screen of the device, chooses from one of three pre-selected contacts (e.g., 911), and selects a contact to automatically dial the recipient and speak on speaker phone, all the while continuing to record the video. In this way, the process for making a call with a mobile device while video recording on the mobile device 10 allows the user to easily make calls while continuing to record the video at the scene of the emergency or event.

To make the process for making a call with a mobile device while video recording on the mobile device of the present disclosure works in live settings, one may create design and develop either software-based solution or an add-on solution. The software solution may involve developing a camera app that has this feature built in for Android, Windows, iOS, or any other mobile platform. The add-on solution may be built as an add-in extension for current and future phones' default camera recording application, so customers have easier ways to reach an emergency responder. If this method is executed through the mobile device's default camera app, then a dial pad icon that is semi-transparent could be on the camera screen permanently. Always giving the option for someone to press it to display a dial pad that someone can type either a number or contact name into it, operating in a similar manner as the default dial pad with contact predictions, so you can make a call right there from the camera screen. Another option would be to have multiple pre-chosen contacts (e.g., the top three contacts along with default 911/emergency services number) to display on the screen by pressing or sliding a phone icon to display them. The application would need a setting section so you can choose these contacts you want to be displayed, with 911/Emergency always being a default option. With multi-array microphones as standard on mobile devices today, microphones could potentially be split to records towards the incident, as well as towards the operator to capture both sounds clearly if needed. Another option would be to have live recording and backup to the cloud at the same time so the recording cannot be deleted. The phone call could be initiated first, then you could go to the recording screen to record while on speakerphone. You could also initiate the phone call by a button on the device which displays the dial-pad/icon/voice option. Another option would be to allow for live streaming of the video to other devices, instead of or in combination with, recording the video while contemporaneously calling and speaking on speakerphone with emergency personnel or other interested parties.

To use the process for making a call with a mobile device while video recording on the mobile device of the present disclosure, a user would start video recording the important situation, and then use the current video screen to make a phone call to any contact while on speakerphone. Making a phone call and recording the incident in full, while still getting help on the scene as fast as possible or relaying information more quickly. No longer will the user have to stop recording the incident to make a phone call for help. The user can make the phone call from the video screen itself.

By way of example, FIGS. 2-7 conceptually illustrate a mobile device implementation of the process for making a call with a mobile device while video recording on the mobile device. Specifically, the mobile device implementation demonstrates a camera app recording an event via the camera of the mobile device while a user initiates a phone call to emergency responder personnel while still recording the event. First, FIG. 2 conceptually illustrates a display of a mobile device 12 running a video capture mobile app with a mobile device screen showing a field of view as captured through a video capture device or camera of the mobile device. As shown, FIG. 2 includes the mobile device 12, a visual display 14 with video displayed on the mobile device screen of the mobile device 12, a phone calling icon 16, and a voice mode icon 22. The visual display screen 14 fits within an outer border that includes both the phone calling icon 16 and the voice mode icon 22. Additional icons are visible in the outer border, such as icon-based tools for operating the video capture device ("camera") of the mobile device 12 from the video capture mobile app. However, in some embodiments, the visual display screen 14 spans an entirety of a viewable area of the mobile device 12 with the phone calling icon 16 and the voice mode icon 22 appearing as semi-transparent overlay graphical elements. In some other embodiments, the phone calling icon 16 and the voice mode icon 22 and other controls are transparent until a user of the mobile device 12 presses a physical button of the mobile device 12 to trigger visible display of the phone calling icon 16 and the voice mode icon 22 and other controls. As shown in this figure, the visual display 14 content displayed on the mobile device screen of the mobile device 12 includes a distressed airplane above ground-level structures (such as the road, trees, building, and water tower).

Figure 3:
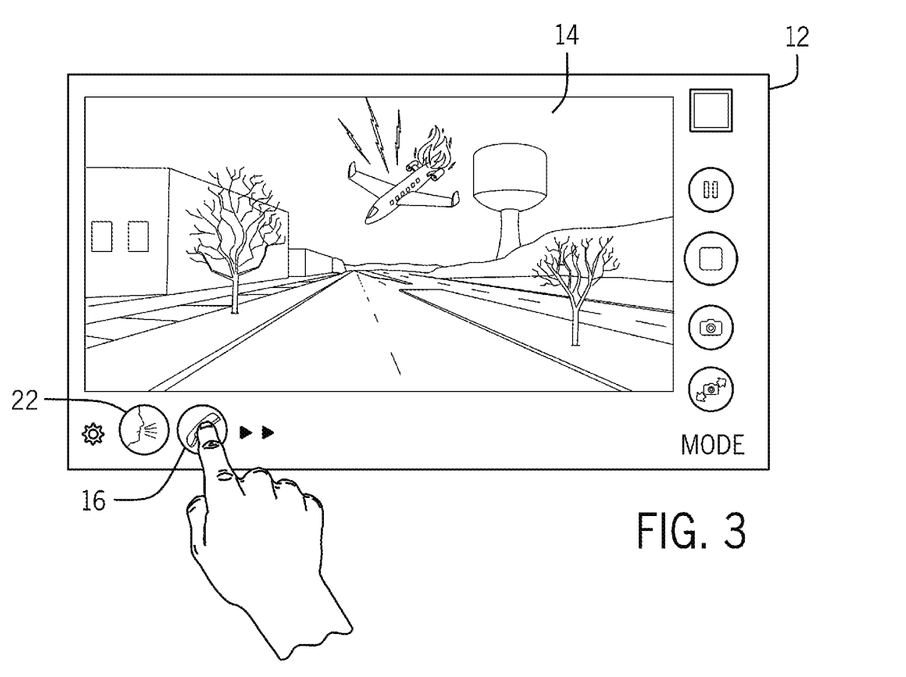
FIG. 3 conceptually illustrates a user selection of a phone calling icon in some embodiments.
Figure 4:
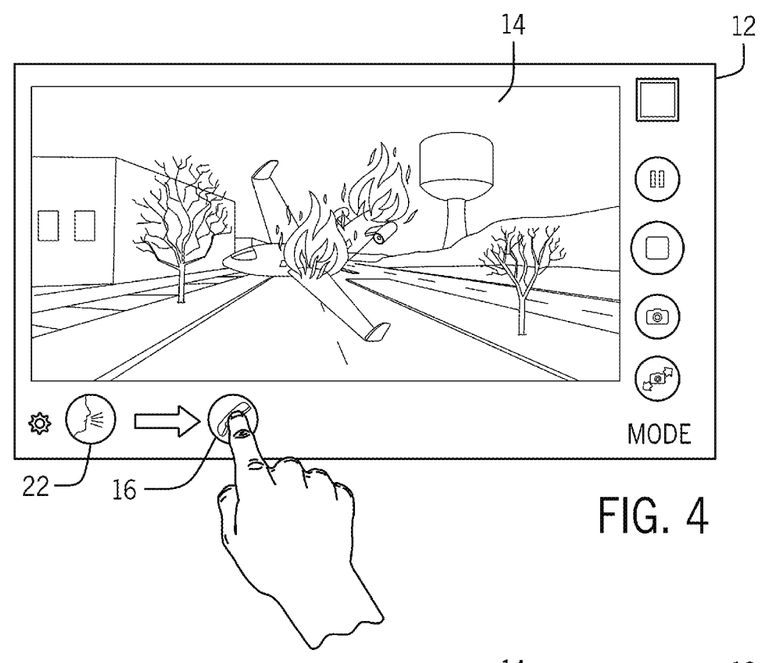
FIG. 4 conceptually illustrates activation of the phone calling capability while continuing to record video of a scene in realtime in a single view in some embodiments.

Now turning to another view, FIG. 3 conceptually illustrates a user selection of the phone calling icon 16. As shown in this figure, the visual display 14 content displayed on the mobile device screen of the mobile device 12 includes the distressed airplane appearing to be on fire and headed for an imminent crash landing. In another example, FIG. 4 conceptually illustrates activation of the phone by the user's selection and sliding (right) of the phone calling icon 16. In this figure, the distressed airplane is shown in the visual display 14 moments later and has now crashed onto the road and fire is breaking out all over the crash area. The scene is being recorded by the camera in realtime as the user slides the phone calling icon 16 to the right to activate the phone calling features, which are described next by reference to FIGS. 5-7.

Figure 5:
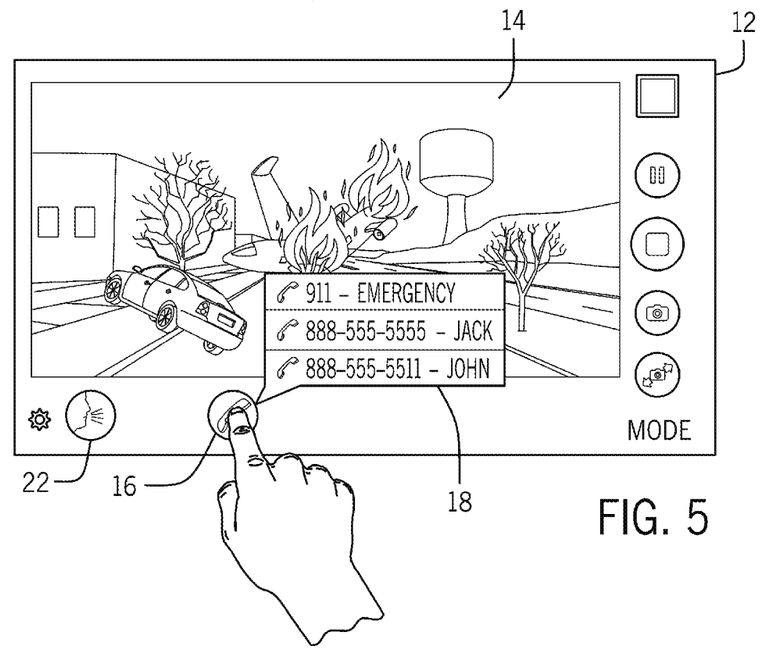
FIG. 5 conceptually illustrates visual output of some pre-programmed phone numbers in some embodiments.

Specifically, FIG. 5 conceptually illustrates visual output of some phone numbers of contacts to call while continuing to record the scene of the airplane crash. The phone numbers of the contacts are shown in a pre-programmed number display 18, which appears when the user slides the phone calling icon 16 to the right. The content of the scene being recorded is also shown here with updated subjects in the recording video shown on the screen, further demonstrating the realtime recording capability while the user engages phone calling tools without missing any of the live events. This is demonstrated, in particular, by the updated visual display 14 showing a car that crashed as a result of the airplane crash, presumably to avoid crashing into the downed airplane.

Figure 6:
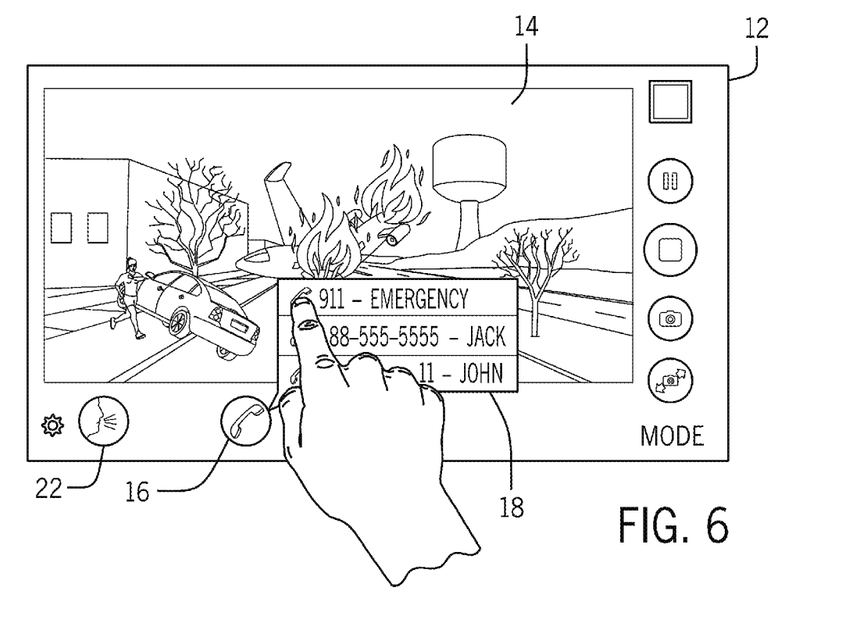
FIG. 6 conceptually illustrates a user selecting one of the pre-programmed phone numbers in some embodiments.

Next, FIG. 6 conceptually illustrates the user selecting one of the phone numbers in the pre-programmed number display 18. Specifically, the user has selected the emergency contact and 911 number to call. The user's selection of the 911 emergency contact occurs while the camera continues to capture video of the scene around the airplane crash. In this figure, another person is shown in the video appearing to run nearby the crashed car, presumably running from the downed airplane and fires.

Figure 7:
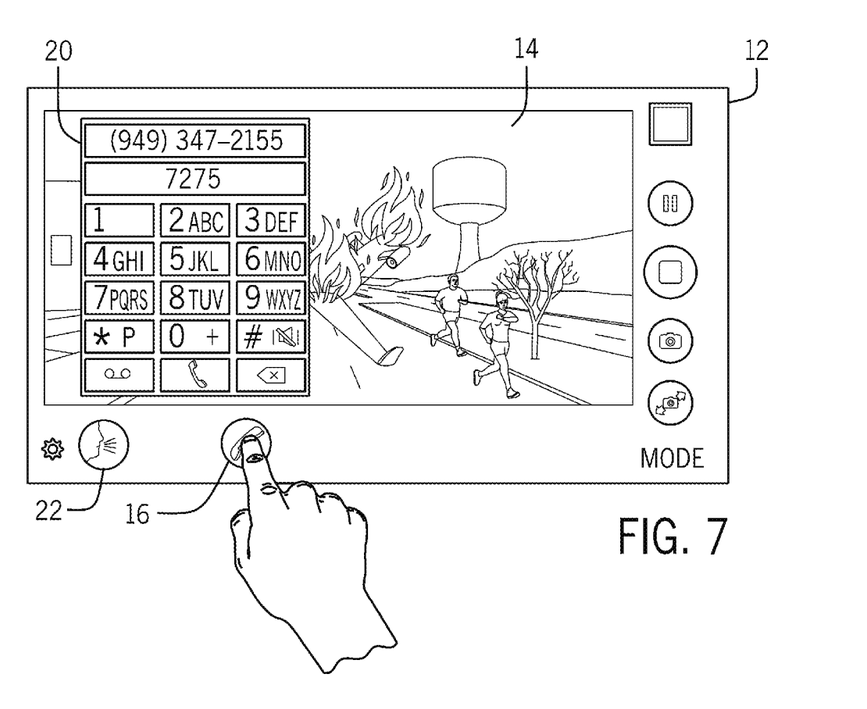
FIG. 7 conceptually illustrates an alternative manner for the user to manually enter or select a phone number in some embodiments.

Now turning to another view, FIG. 7 conceptually illustrates an alternative mechanism for the user to use phone calling features (select/enter a phone number of a contact). In particular, the user is calling a number by way of a manual selection number display 20 that appears after the user slides the phone calling icon 16 to the right and subsequently taps the phone calling icon 16 to trigger a manual selection number display 20. From the manual selection number display 20, the user can manually enter the telephone number to call. This is useful when no pre-programmed contact numbers are set, or when the list of pre-programmed numbers does not include a particular number of a contact whom the user wishes to call. Here, similar to a previous view, people are shown hurrying out of the area of the airplane crash, which is being recorded in realtime as the user makes the phone call via the manual selection number display 20, thus allowing the user to keep an eye on the events of the scene being recorded.

Of particular importance, as demonstrated in the views of FIGS. 2-7, is the that the user can select the phone calling icon 16 while recording the video, in this case, the video of the airplane in free fall, the airplane crashing, fire spreading, car crashing, people running about, and other havoc which necessitates immediate attention from emergency services. The user may be recording the video the whole time contemporaneously with selecting the phone calling icon 16, selecting a contact, and making the phone. In this way, the user can ensure that the video recording is always visibly apparent. No more switching between apps to make a call while also recording video/viewing the scene through the camera's field of view.

Figure 8A:
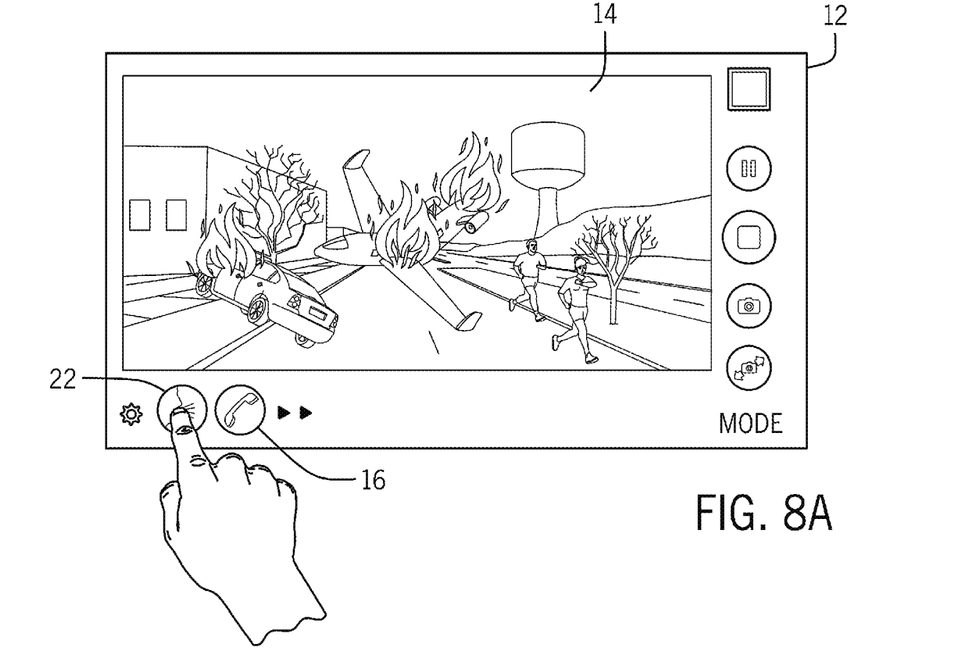
FIG. 8A conceptually illustrates a user selection of a "voice mode" icon in some embodiments.
Figure 8B:
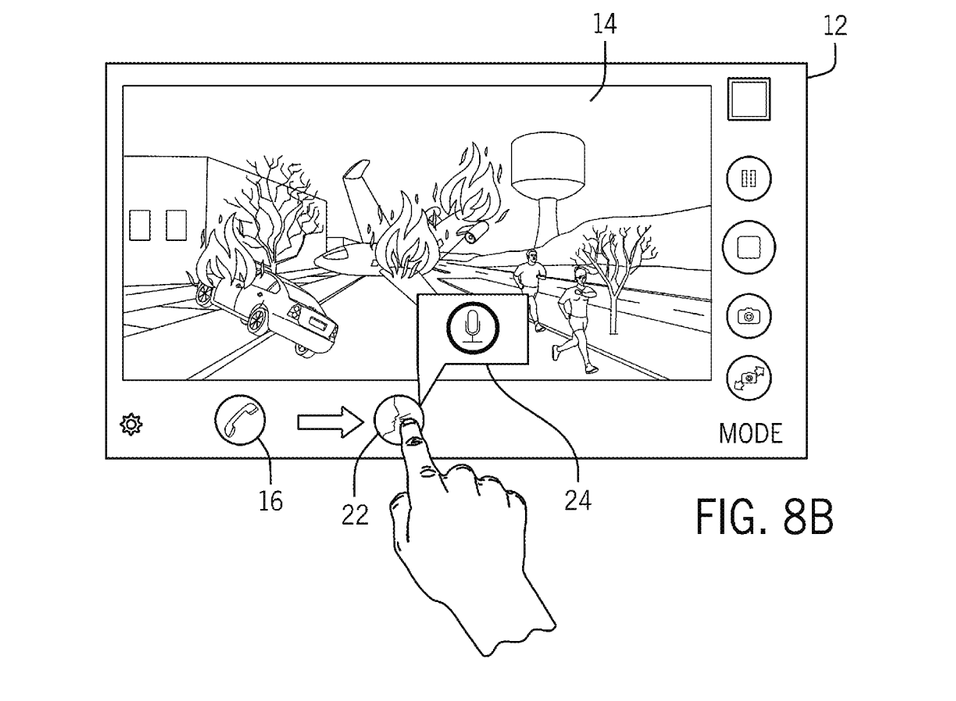
FIG. 8B conceptually illustrates activation of voice mode in some embodiments.

Now turning to a different example that involves voice activated calling, FIG. 8A conceptually illustrates a user selection of a "voice mode" icon, while FIG. 8B conceptually illustrates activation of voice mode. As shown first in FIG. 8A, the user is making a touch gesture of the voice mode icon 22. Now, turning to FIG. 8B, the user slides the voice mode icon 22 to the right to select voice activated calling features (or "voice control"). Also, an activated voice mode icon 24 appears once voice control is set. In this way, the user can simply speak the name of a contact or a telephone number to call, while continuing to record the scene and see what is being recorded in realtime without switching between different apps on the mobile device 12.

Additionally, the process for making a call with a mobile device while video recording on the mobile device can be adapted and implemented for use by other sound based control mechanisms, touch-based gesture controls, or to use WiFi-calling, etc., while still recording the incident/scene in realtime. Furthermore, the process for making a call with a mobile device while video recording on the mobile device can be adapted and implemented as a modular plug-in app or modular plug-in tools into other apps that allow someone to call for emergencies from their phone while using a mobile service app. If something is happening to them, they could call and record the situation with the same device. It could become a standard feature on laptops and other video recording devices. Also, this type of function or option could be incorporated into a camera that automatically calls emergency services based off certain situations the camera sees.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
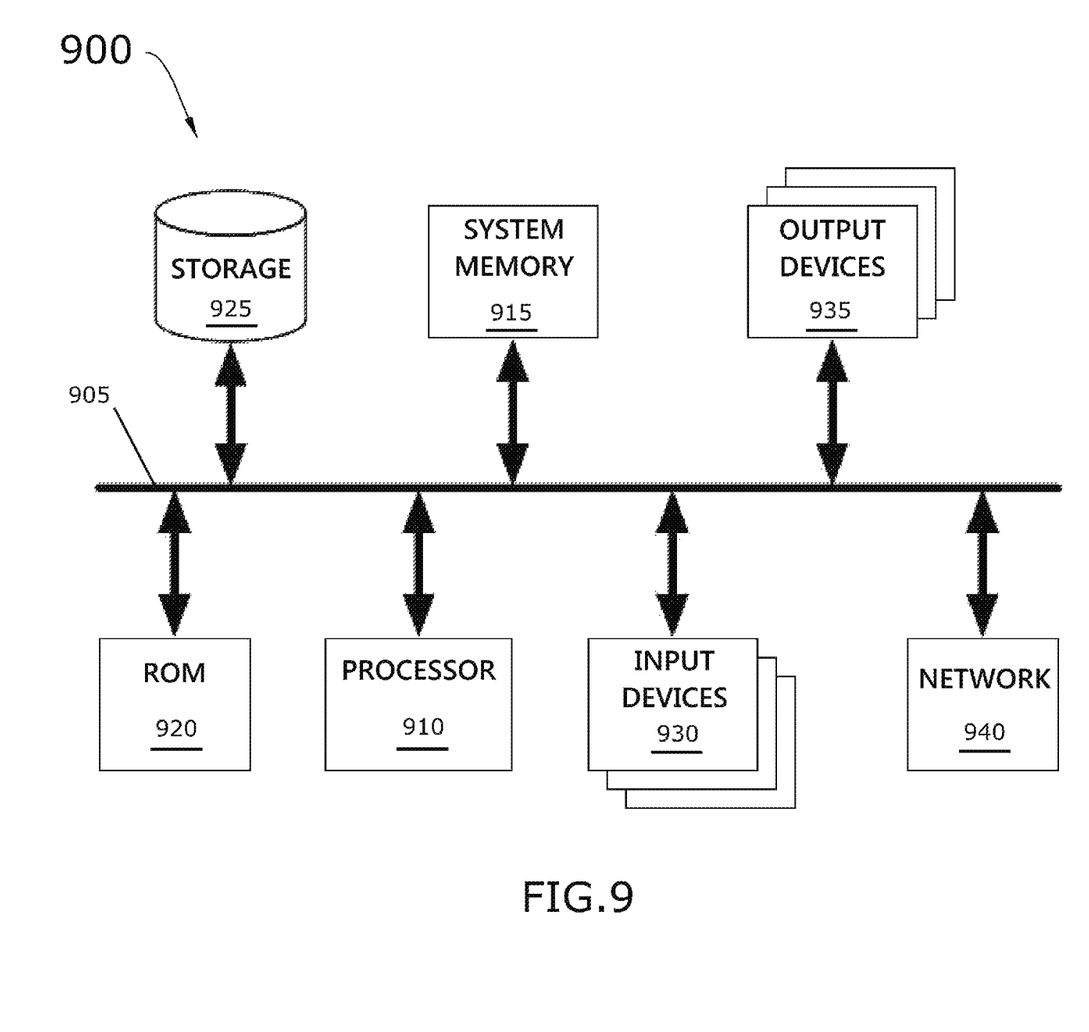
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer, phone, PDA, or any other sort of electronic device. Such an electronic system includes various types of computer readable media and interfaces for various other types of computer readable media. Electronic system 900 includes a bus 905, processing unit(s) 910, a system memory 915, a read-only 920, a permanent storage device 925, input devices 930, output devices 935, and a network 940.

The bus 905 collectively represents all system, peripheral, and chipset buses that communicatively connect the numerous internal devices of the electronic system 900. For instance, the bus 905 communicatively connects the processing unit(s) 910 with the read-only 920, the system memory 915, and the permanent storage device 925.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 925.

Other embodiments use a removable storage device (such as a floppy disk or a flash drive) as the permanent storage device 925. Like the permanent storage device 925, the system memory 915 is a read-and-write memory device. However, unlike storage device 925, the system memory 915 is a volatile read-and-write memory, such as a random access memory. The system memory 915 stores some of the instructions and data that the processor needs at runtime. In some embodiments, the invention's processes are stored in the system memory 915, the permanent storage device 925, and/or the read-only 920. For example, the various memory units include instructions for processing appearance alterations of displayable characters in accordance with some embodiments. From these various memory units, the processing unit(s) 910 retrieves instructions to execute and data to process in order to execute the processes of some embodiments.

The bus 905 also connects to the input and output devices 930 and 935. The input devices enable the user to communicate information and select commands to the electronic system. The input devices 930 include alphanumeric keyboards and pointing or cursor control devices. The output devices 935 display images generated by the electronic system 900. The output devices 935 include printers and display devices, such as cathode ray tubes (CRT) or liquid crystal displays (LCD). Some embodiments include a touchscreen that functions as both an input and output device.

Finally, as shown in FIG. 9, bus 905 also couples electronic system 900 to a network 940 through a network adapter (not shown). In this manner, the computer can be a part of a network of computers (such as a local area network ("LAN"), a wide area network ("WAN"), or an Intranet), or a network of networks (such as the Internet). Any or all components of electronic system 900 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 1 conceptually illustrates a process. The specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory computer readable medium storing a program which, when executed by a processor of a mobile device, makes a phone call from a video recording app that is recording a video of a live scene by a camera of the mobile device, said program comprising sets of instructions for:
    opening a video recording app on a mobile device of a user, said mobile device comprising a video capture device that captures video and imagery of a live scene and a multi-array microphone that splits audio detection in at least a first direction toward the user of the mobile device and a second direction toward the live scene;
    initiating video recording of the live scene by the video capture device in connection with audio detection by the multi-array microphone in the second direction toward the live scene on the mobile device via the video recording app;
    tapping and holding a phone-dial pad icon on a screen of the video recording app while the video recording of the live scene is ongoing by the video capture device and audio detection continues in the second direction toward the live scene by the multi-array microphone on the mobile device;
    sliding the phone-dial pad icon to trigger a drop down of multiple contacts that are visually output as a pre-programmed number display;
    selecting one contact from the multiple contacts;
    dialing a number associated with the selected contact;
    initiating a speaker phone call with the selected contact when the mobile device is connected to a phone associated with the number of the selected contact, wherein the multi-array microphone detects audio for the speaker phone call in the first direction toward the user of the mobile device;
    continuing to capture video of the live scene with the video capture device on the mobile device and, in connection with continuing to capture video, detecting audio in the second direction toward the live scene by the multi-array microphone of the mobile device while the speaker phone call is actively connected to the phone of the selected contact with the multi-array microphone detecting audio for the speaker phone call in the first direction toward the user of the mobile device; and
    shrinking a viewable area of the pre-programmed number display during the speaker phone call so as to maximize the viewable area of the video captured with the video capture device on the mobile device.

2. The non-transitory computer readable medium of claim 1, wherein the program further comprises a set of instructions for displaying the phone-dial pad icon on the screen of the video recording app.

3. The non-transitory computer readable medium of claim 2, wherein the phone-dial pad icon is semi-transparent.

4. The non-transitory computer readable medium of claim 1, wherein the screen comprises a touch screen of the mobile device.

5. The non-transitory computer readable medium of claim 4, wherein the set of instructions for sliding the phone-dial pad icon to trigger the drop down of multiple contacts that are visually output as the pre-programmed number display comprises a set of instructions for receiving a slide gesture on the touch screen from a finger of the user.

6. The non-transitory computer readable medium of claim 5, wherein the slide gesture comprises a slide gesture to a right side of the touch screen.

7. The non-transitory computer readable medium of claim 1, wherein the drop down of multiple contacts that are visually output as the pre-programmed number display comprises a plurality of contact number entries, wherein each contact number entry comprises a contact name and a contact telephone number.

8. The non-transitory computer readable medium of claim 1, wherein the program further comprises a set of instructions for detecting a selection of a physical button of the mobile device.

9. The non-transitory computer readable medium of claim 8, wherein the program further comprises a set of instructions for displaying the phone-dial pad icon on the screen of the video recording app in response to detecting the selection of the physical button of the mobile device.

10. The non-transitory computer readable medium of claim 1, wherein the program further comprises a set of instructions for displaying a voice control icon on the screen of the video recording app, wherein a selection of the voice control icon allows the user to specify one of a contact name and a contact telephone number to call while continuing to record video.

* * * * *